United States Patent [19]

Douglas

[11] 4,452,523

[45] Jun. 5, 1984

[54] METHOD OF AND APPARATUS FOR PROCESSING FILM

[75] Inventor: Lawrence M. Douglas, South Easton, Mass.

[73] Assignee: Polaroid Corporation, Cambridge, Mass.

[21] Appl. No.: 391,703

[22] Filed: Jun. 24, 1982

[51] Int. Cl.[3] .......... G03B 5/06

[52] U.S. Cl. .......... 354/303; 354/318; 352/130; 242/180

[58] Field of Search .......... 354/84, 85, 86, 87, 354/301, 303, 305, 317, 318, 319, 78; 242/55.21, 55, 180; 352/78 R, 130

[56] References Cited

U.S. PATENT DOCUMENTS

| | | | |
|---|---|---|---|
| 2,880,657 | 4/1959 | Bartlett | 354/78 |
| 3,025,368 | 3/1962 | Hibbard et al. | 242/55.21 |
| 3,244,471 | 4/1966 | Mead | 242/55.21 |
| 3,331,301 | 7/1967 | Dieffenbach | 354/301 |
| 3,628,744 | 12/1971 | Martin | 242/55.21 |
| 3,640,204 | 2/1972 | Gordon | 354/318 |
| 4,145,133 | 3/1979 | Wareham | 354/275 |
| 4,167,318 | 9/1979 | Wareham | 354/298 |
| 4,325,624 | 4/1982 | Pedroli | 354/304 |

*Primary Examiner*—A. A. Mathews

*Attorney, Agent, or Firm*—Leslie J. Payne

[57] ABSTRACT

There is disclosed a method of and apparatus for developing an elongated strip of photographic film of the self-developing type. The apparatus comprises an imbibing assembly including a wheel assembly of large diameter mounted for rotation on a given axis. Means on the wheel assembly support the strip of film on the perimeter of the wheel assembly and include means providing access of a leading portion of the film to the interior portion defined by the wheel assembly. Drive means rotate both the wheel assembly and a take-up reel located interiorly of the assembly and to which the leading portion of the film is attached. The drive means advances the film around the perimeter of the wheel assembly and into the interior portion, whereby successive sections of the film with its processing fluid layer are advanced over at least a portion of the perimeter of the wheel assembly for imbibition and then advanced into the interior portion of the wheel for take-up.

14 Claims, 8 Drawing Figures

METHOD OF AND APPARATUS FOR PROCESSING FILM

BACKGROUND OF THE INVENTION

This invention relates, in general, to continuously processing sheet materials. More particularly, it concerns itself with a portable photographic film processor capable of providing for the continuous processing of significant lengths of self-developing type film in a compact arrangement.

To date, the conventional processing of exposed cinematographic film is a rather elaborate, costly and time-consuming process. Besides, it requires that the exposed film be removed from the camera and then forwarded to a commercial developer for processing. After commercial developing, the processed film is returned by mail or otherwise to the user. Because of the need for commercial developing, several day or even weeks elapse ordinarily before the film can be viewed. Obviously, this is less than highly desirable, especially in situations wherein it is desirable to view the film immediately.

Recent motion picture systems have been devised in which exposure, processing and projection operations are carried out on a photographic film strip contained at all times in a multipurpose cassette. Such a system has been disclosed in several United States Patents, assigned in common with the present invention. In these cassettes, a supply of light-sensitive film is exposed in a camera adapted to receive the cassette. Processing or developing of the exposed film to provide the conventional series of positive transparent image frames is achieved by merely placing the cassette in a player or processor and viewing apparatus capable of activating a processor in the cassette. After processing, the player apparatus is operated as projector to advance the film, frame-by-frame, past a light source for viewing.

While the advance in the motion picture art represented by such an instant photographic system is apparant and needs no elaboration, such a system requires the use of a cassette which houses both the self-developable film strip and the processing station. In addition, a specially constructed camera for use with the cassette is needed, as well as a specially constructed processor and viewer.

It has been proposed recently to make the advantages of instant photography more versatile. More particularly, it has been proposed to use a self-developing or instant film of the transparency type in conventional cameras.

In this connection, the film would be exposed in and removed from a conventional camera and then processed in a separate processor for developing the latent images therein. As a result, fully developed transparencies would be produced. Commonly-assigned U.S. Pat. Nos. 4,145,133, 4,167,318 and 4,325,624 are representative of such an approach.

In processing film of the above type, it is critical for satisfactory developing that the processing fluid be applied to the film strip uniformly and with sufficient thickness within extremely small tolerances. Failure to achieve the above will result in undesirable developing which would diminish the quality of the image viewed during projection. It follows, therefore, that the achievement of a uniform layer of processing fluid on the film and a desired thickness thereof during the processing operation is a major focal point of attention in overall film development.

Beyond the need for achieving the above, there is a correspondingly important requirement that the imbibition of the film be carried out within a proper time interval. Imbibition process occurs when the emulsion side of the film strip is in contact with the processing fluid. Timing control of imbibition is particularly critical during the processing sequence. This is particularly true of certain film formats, such as color film which use the diffusion transfer process. Should the imbibition interval not be terminated at a proper point in time, the overall color balance may be improper. Likewise, in cases where the imbibition interval is shortened, beyond acceptable limits, the overall color balance will tend to be improper. Thus, it is critical not to have imbibition terminate prematurely or continue for an interval longer than that necessary. Thus, it can be appreciated readily that during the processing of the self-developing film of the above type, certain critical parameters requiring processing fluid application and film imbibition must be satisfied in order for the processing to produce high quality images. Moreover, these significant problems are further compounded if hundreds of feet of film are to be developed, especially if compact space considerations are desired.

SUMMARY OF THE INVENTION

It is an object of the present invention to provide a method of and apparatus for continuously processing photographic film, especially in a manner which meets the processing requirements necessary for developing this kind of film.

According to the present invention, there is provided a compact apparatus comprising means including a rotatable assembly of a given size mounted for rotation on a given axis. The perimeter of the assembly is configured for supporting the strip of material and includes means providing access of a leading portion of the strip to an interior portion defined by the assembly. Included is a take-up reel of a size comparatively smaller than the given size and is mounted for rotation in the interior of the assembly. The take-up reel is configured to have the leading end portion of the strip attached thereto. Means for guiding the strip to the perimeter of the rotatable assembly is provided as well as means for treating at least one surface of the strip as it is advanced to the perimeter of the assembly. Drive means are provided for rotating both the assembly and the take-up reel to advance the strip around the perimeter of the assembly and into its interior, whereby successive sections of the treated strip are advanced over the perimeter of the assembly and then advanced into the interior of the assembly for take-up.

In another illustrated embodiment, there is provided a compact apparatus for developing an elongated strip of photographic film of the self-developing type having an emulsion surface. The apparatus comprises an imbibing assembly including a wheel assembly of large diameter mounted for rotation on a given axis. Means on the wheel assembly provide for support of the strip of film on the perimeter of the wheel assembly and includes means providing access of a leading portion of the film to the interior portion defined by the wheel assembly. Included is a film take-up reel of comparatively small diameter mounted for rotation within the interior portion. The film take-up reel is configured for attachment of the leading end of the film thereto. Means for guiding said film to the perimeter of said wheel assembly is provided as well as fluid depositing means for depositing a layer of processing fluid on the emulsion surface as it is advanced to the perimeter of the wheel assembly. This embodiment includes drive means for rotating both the wheel assembly and the take-up reel to advance the film around the perimeter of the wheel assembly and into the interior portion, whereby successive sections of the film with its processing fluid layer are advanced over a portion of the perimeter of the wheel assembly for imbibition and then advanced into the interior portion of the wheel assembly for take-up.

Another illustrated embodiment further includes means for guiding a cover sheet into superposed relation to the one surface of the sheet. Provided also is a second take-up reel mounted generally interiorly of the wheel for rotation within the interior thereof in spaced relation to the first take-up reel. The second take-up reel is configured for attachment thereto of the cover sheet. The present invention includes means for rotating the second take-up reel in general unison with the first take-up reel and at respective velocities, whereby the film sheet and cover sheet are advanced together about the rotating wheel and through the access opening and in a manner such that they can be peeled-apart and travel along separate paths to their respective take-up reels.

In another illustrated embodiment, the perimeter of the wheel assembly includes means for guiding and supporting the film in a low-friction arrangement so as to facilitate advancement of the film thereabouts in response to the rotation of the take-up reels.

Another illustrated embodiment includes means for initially driving the wheel assembly at a first predetermined rate prior to rotation of said take-up reels and then at a lower rate once rotation of said take-up reel occurs so as to at least partially compensate for the additional linear advancement of the film by take-up reels and thereby retain the advancement of said film across the processing means within a predetermined range and also maintain peel-apart within a predetermined range.

It is an object of the present invention to make provision for an improved method of and apparatus for automatically processing sheet material; the provision of an improved method of and apparatus in which the foregoing is accomplished in a compact arrangement; the provision of a method of and apparatus for continuously processing photographic film in a single operation; the provision of a method of and apparatus for achieving the last-noted object in a compact arrangement without film wastage; the provision of a method wherein the film can be processed in a single operation and can then be viewed without having to be rewound; the provision of a method of and apparatus for laminating a cover sheet to the emulsion surface of an exposed photograhic film strip and progressively advancing them about a perimeter of a rotatable member and into the interior of the member through an access opening in the perimeter, so that the cover sheet and film strip are peeled-apart with respect to each other as each is wound about respective take-up reels mounted for rotation in the interior portion; and, the provision of a method of and apparatus for controlling the deposition of a proper amount of processing fluid, while at the same time controlling the time for imbibing the film strip within proper bounds.

These and other objects and features of the present invention will become apparent from the detailed description to follow when taken in conjunction with the accompanying drawings wherein like parts are designated by like reference numerals throughout the several views.

DETAILED DESCRIPTION

Figure 1:
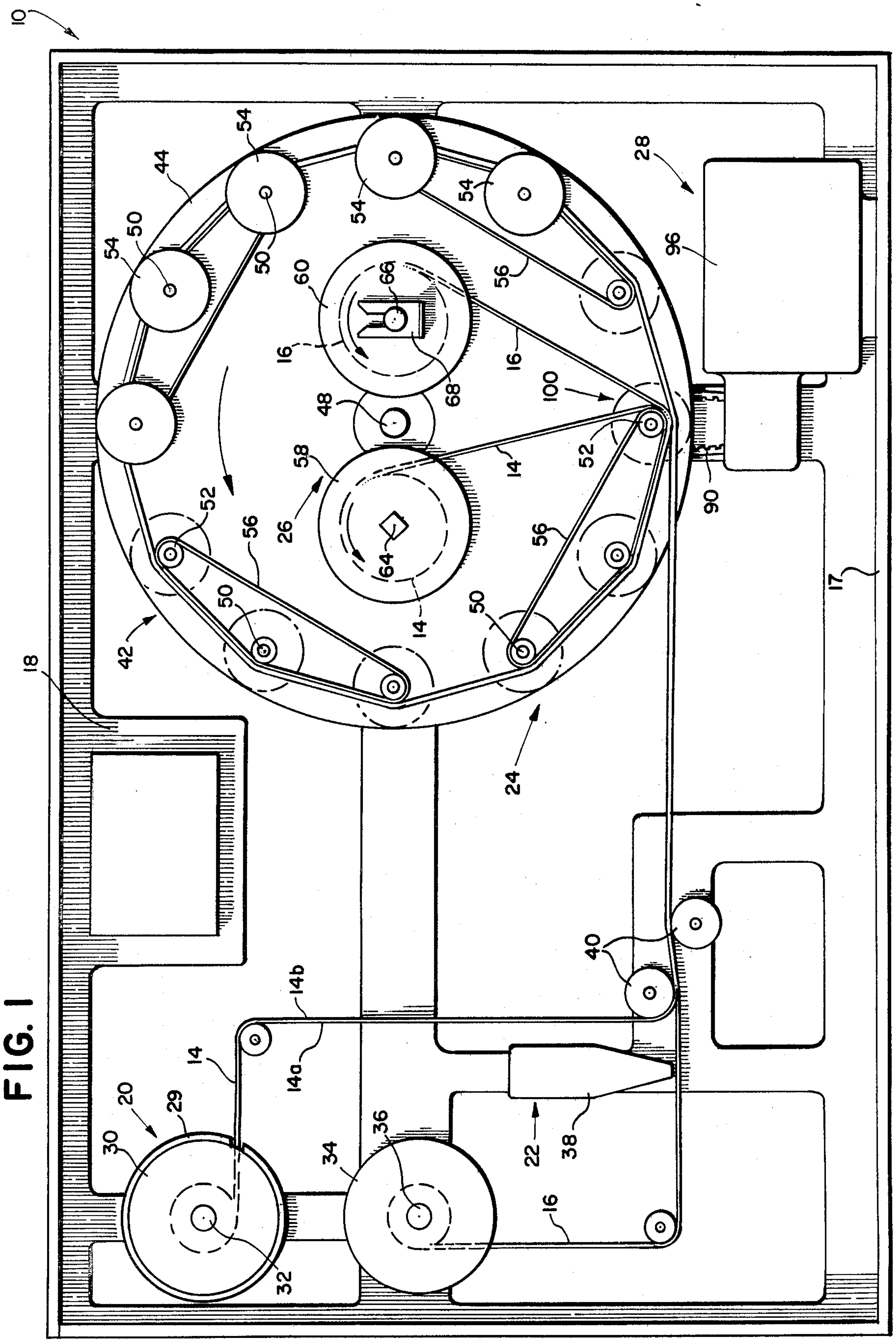
FIG. 1 is a side elevational view showing major operating components of the processor of the present invention.

Reference is now made to FIGS. 1 through 6 for showing the improved film processor made in accordance with the present invention and indicated generally by reference numeral 10. In this embodiment, the processor 10 is useful for purposes of processing a strip of 16 mm photographic film usable in a movie camera. The processor 10 can process such film in a single, automatic and continuous operation without film wastage.

The processor 10 includes a lighttight processor housing 12 which, in the present embodiment, is defined as a parallelepiped structure having a casing 13*a* and hingedly connected thereto a cover 13*b*. The cover 13*b* is releasably latched to the casing 13*a* in a conventional manner. The processor 10 is portable and compact. In this regard, it can be stored under an airline seat.

The photographic film to be processed is of the self-developing kind, preferably of the transparency type. For example, the film strip 14 can be a photosensitive additive multicolor-type structure having an exposure surface 14*a* and an emulsion surface 14*b* upon which processing fluid will be applied. As will be described, the photograhic film strip 14 will come into intimate contact with a flexible covering or stripping sheet strip 16. This strip 16 can be made of, for example, plastic material, such as polyester, and has a width approximately equal to the width of the film strip 14. As will be described, the covering sheet strip 16 is brought into intimate engagement with the emulsion surface 14*b* for purposes of initiating formation of visible images in the film strip 14. In an embodiment the cover sheet after overlying the wetted emulsion, upon diverging separation from the film causes at least a portion of the emulsion to be retained by adhesion to the sheet.

Mounted in and affixed to the processor housing 12 is a generally elongated base plate 17 having a vertically extending support frame 18. Towards the end of processing the film strip 14, the processor 10 includes essentially a supply station 20, fluid dispensing station 22, imbibition station 24, separating station 26, and a driving assembly station 28.

Figure 2:
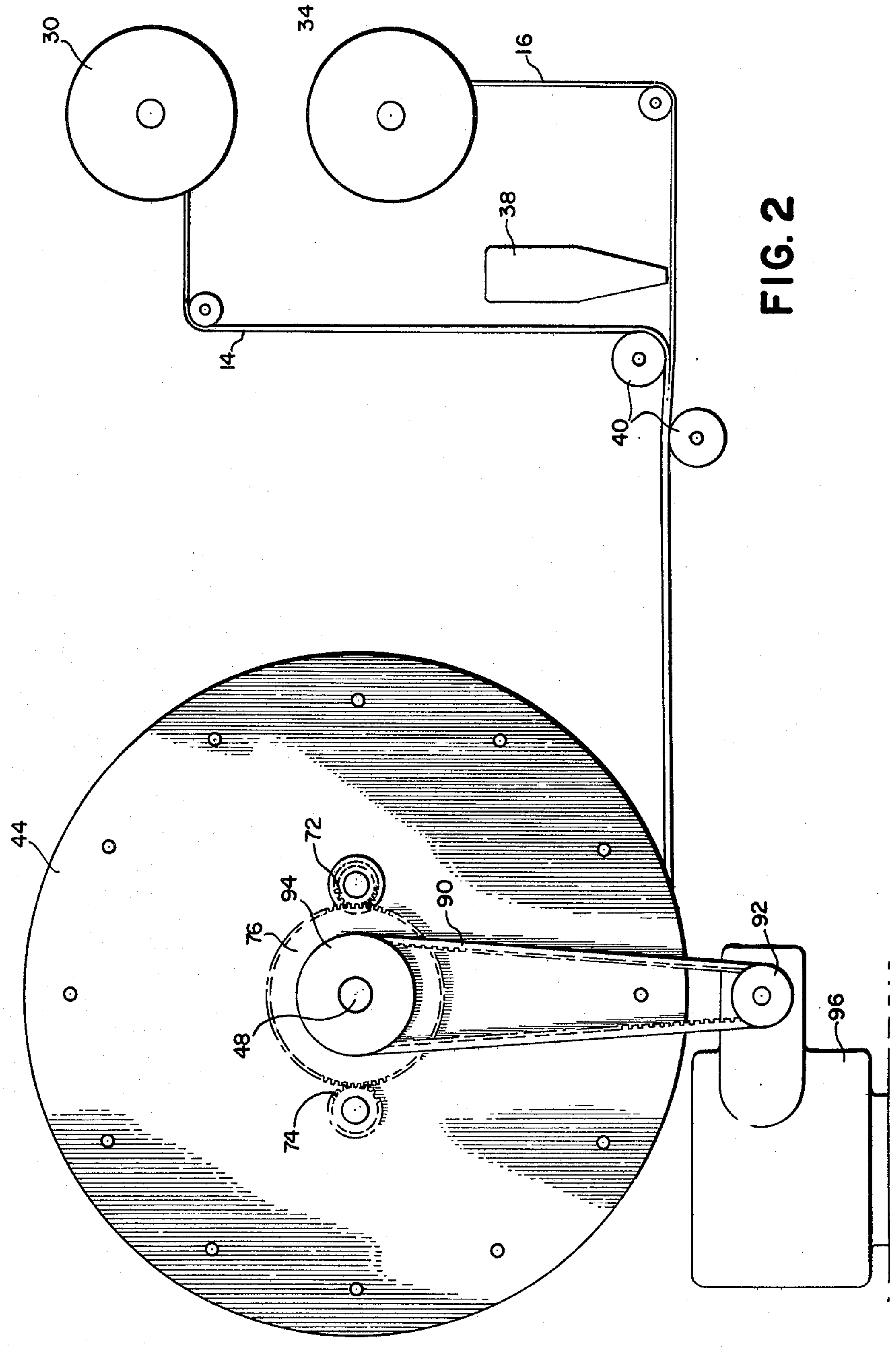
FIG. 2 is a schematic view showing the other side of the processor depicted in FIG. 1.

Reference is made to FIGS. 1 and 2 to show the supply station 20. It is seen to include a film housing assembly 29 for housing a supply reel 30 mounted for relative rotation on a shaft 32 attached to the support frame 18. The reel has wrapped thereon the strip of exposed film 14. The supply reel 30 is mounted such that when the film strip 14 is paid-out, the emulsion surface 14*b* will be able to contact the cover sheet 16. The supply reel 34, which has wrapped thereabouts a supply of the covering or stripping sheet material, is mounted for rotation on a shaft 36 attached to the support frame 18.

Reference is now made to FIGS. 1 and 2 for showing the dispensing station 22. As shown, there is attached to the support member 18 a fluid dispensing assembly 38 which includes a reservoir containing the processing fluid. The processing fluid may be an aqueous processing liquid for developing the film strip 14. The dispensing assembly 38 includes a nozzle assembly (not shown) at the bottom end thereof which is specifically constructed to insure deposition of a uniform layer of processing fluid on a surface of the cover sheet strip 16. For the processing fluid to be effective, it must be dispensed in a uniform layer of predetermined thickness and within small tolerances. Towards this end, the linear advancement rate at which the cover strip 16 is advanced beneath the nozzle of the fluid dispensing assembly 38 has been determined to be effective in controlling this layer thickness. The linear advancement rate should fall within a predetermined range and, preferably, should be constant.

Although this embodiment shows the processing fluid being deposited on the upper surface of the covering sheet strip 16, it is to be understood that the fluid can be directly applied to the emulsion surface 14*b*.

The imbibition station 24 includes a pair of rollers 40 attached to the support 18 and arranged for guiding both the film strip 14 and the cover sheet strip 16 along their respective paths and for causing lamination thereof. Once the emulsion surface 14*b* is brought into contact with the wetted surface of the cover sheet strip 16, the imbibition period begins and will continue until peel-apart at the separating station 26. The imbibition station includes an imbibing assembly 42 which is connected to and supported by the support frame 18. Included is an imbibing wheel 44 which is fixedly attached to a drive shaft 48 driven by the driving assembly 28. thus, whenever the driving assembly 28 rotates the drive shaft 48, the imbibing wheel 44 is rotated. The imbibing wheel 44 has connected thereto a plurality of circumferentially spaced support shafts 50 having mounted thereon ball bearing assemblies 52. The ball bearing assemblies 52 support a plurality of spools 54 which serve to guide and align the convolutions that are wrapped about the imbibing wheel 44. Since the spools 54 are spread apart, they define an access opening for allowing the leading ends of the strips 14, 16 to be initially fed to the take-up reels of the separating assembly as well as allow the inner convolution on the spools 54 to be take-up. A plurality of endless bands 56 extend about groups of three spools 54. The bands 56 serve to eliminate lines of contact which would otherwise exist between the inner convolution of the laminated film strip 14 and cover sheet strip 16 resting directly on the spools 54. The bands 56 are made of a low-friction material which enhances withdrawal of the inner convolutions at the separating station 26. Also, the spools define an effective perimeter for the wheel assembly.

Figures 3, 4:
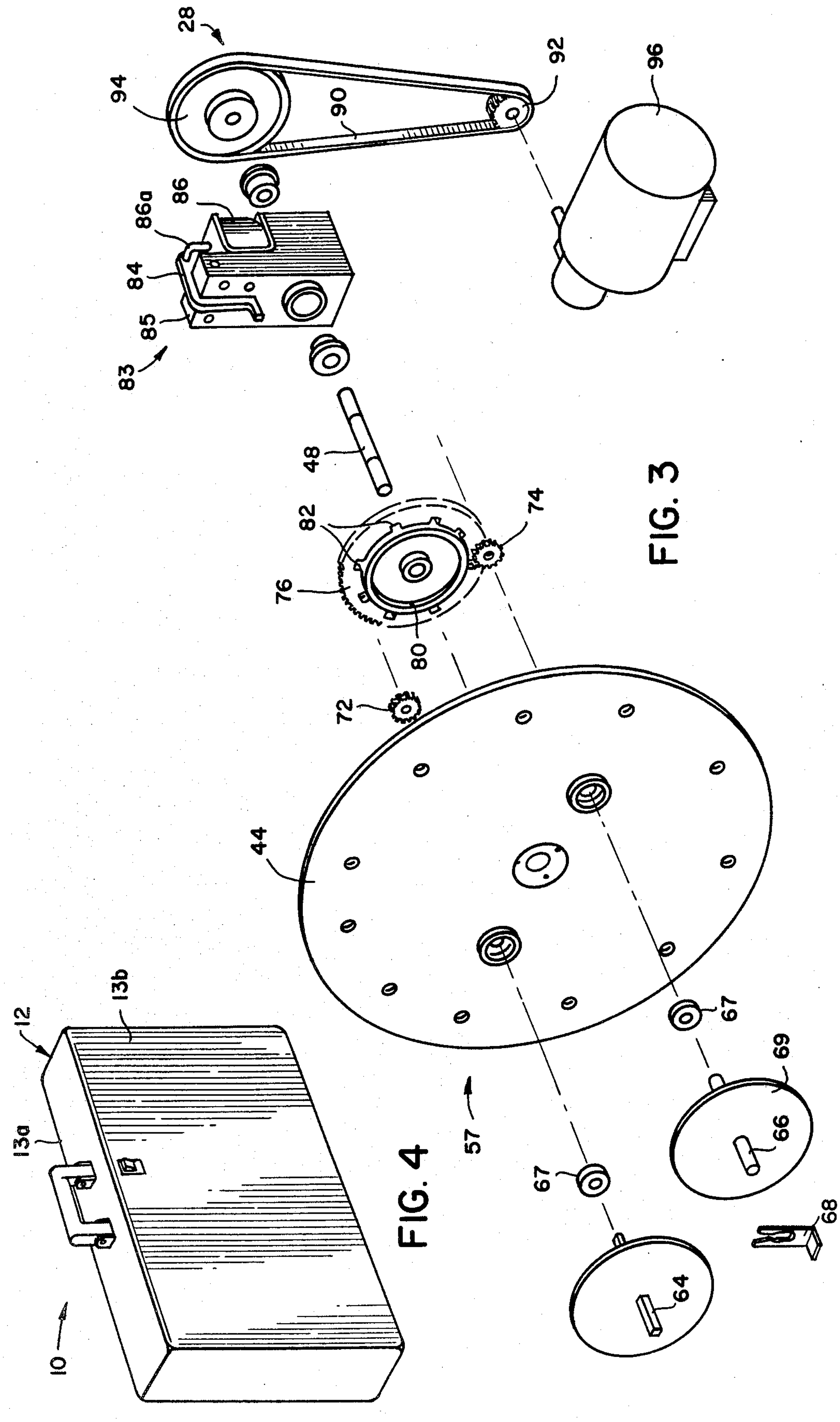
FIG. 3 is an exploded perspective view showing certain structure of the present invention.
FIG. 4 is a perspective view showing the processor housing.

Reference is now made to the separating station 26 which includes a separating assembly 57. Included in the separating assembly 57 and mounted on the imbibing wheel 44 is a pair of diametrically spaced apart film take-up and cover sheet take-up reels 58 and 60, respectively. As can be seen, these reels are positioned in an interior portion, in part, defined by and radially inwardly of the spools 54. Both the film take-up reel 58 and the cover sheet take-up reel 60 are mounted on drive shafts 64 and 66, respectively. The drive shafts 64 and 66 are journaled to the imbibing wheel 44 for rotation relative thereto by ball bearing assemblies 67 (FIG. 3). Thus, the drive shafts 64, 66 can move with the wheel 44 as well as rotate relative to the wheel. The significance of this will become apparent. The drive shaft 64 is, preferably, non-circular and serves to drive positively the film take-up reel 58, while the cover sheet take-up reel 60 is mounted loosely for rotation about the shaft 66. A spring-clip device 68 is mounted on the shaft 66 and serves to bias the cover sheet take-up reel 60 against the flange 69 connected to the shaft 66. Thus, the cover sheet take-up reel 60 is permited to slip relative thereto. This is done because it is important to have the wrap speed of the cover sheet strip 16 no faster than the wrap speed of film strip 14. The significance of this will be described presently. Attached to the drive shafts 64 and 66, respectively, are planet gear members 72 and 74. These planet gear members 72, 74 meshingly engage a sun gear 76 which is journaled for rotation with respect to the support frame 18 and the drive shaft 48.

In this particular embodiment, the thickness of the cover sheet strip 16 is greater than that of the film strip 14. Unless compensated for, the cover sheet strip 16 would tend to be wrapped upon the reel 60 at a faster rate than the film strip 14 on the reel 58. This would be highly undesirable because it would withdraw the inner convolutions of the cover sheet strip 16 at a faster rate than the film strip 14. Consequently, imbibition would be affected adversely. Moreover, the film strip 14 and the cover sheet strip 16 could not be peeled-apart or separated properly, because the strip 16 would be pulled in at higher speed and with higher tension.

To insure that the take-up speed of the strips 14 and 16 are approximately the same, it was determined to have the take-up reel 58 control the take-up of the strips 14 and 16. Towards this end, the take-up reel 60 is allowed to slip relative to the drive shaft 66. As noted, this is because of the circular drive shaft 66 and the clip device 68. Also towards this end, the planet gear 72 is smaller than the planet gear 74. This causes the drive shaft 66 to rotate at a lesser speed than the drive shaft 64. The foregoing arrangement compensates for the fact that the thicker cover sheet 16 would tend to wrap at a greater velocity than the film strip 14. It will be appreciated that the present invention contemplates changing the rotational speeds of the reels 58, 60. This would depend on a number of factors, such as thicknesses of the strips or the speed at which it is desired to pull in the inner convolution wrapped on the wheel 44.

As will be described in greater detail, the planet gears 72 and 74 revolve in unison sun gear 76 during an initial phase of the operational cycle and will then, during a later phase, both orbit and rotate with respect to the sun gear. When both planet gears 72 and 74 rotate with respect to the sun gear 76, they drive the drive shafts 64 and 66, respectively. Rotation of the planet gears 72, 74 will cause the take-up reels 58 and 60 to rotate and, in turn, cause the separating or peeling apart of the film strip 14 and the cover sheet strip 16. This also ends imbibition. Since the take-up reel 58 controls pulling of both the film strip 14 and cover sheet strip 16, imbibition is not adversely affected.

For effecting commencement of the rotation of the planet gears 72, 74, the sun gear 76 must be held stationary. It will be understood that prior to such commencement, the sun gear 76 is rotating with the imbibing wheel 44. This is due to the friction ring 80 on the sun gear 76 frictionally engaging the wheel so as to be driven by the imbibing wheel 44.

Towards the end of restraining the sun gear 76, the latter is provided with a plurality of locking openings 82. Also provided by the separating assembly 57 is a locking assembly 83. Included in the locking assembly 83 is a pivotal locking lever 84. The lever 84 is pivoted to a locking housing 85 and has one end attached to a solenoid 86 and the other end free to engage one of the locking openings 82. When so engaged, the sun gear 76 is in a locked condition. The solenoid 86 is fixedly attached to the locking housing 85. During operation of the locking assembly 83, the solenoid 86 is energized and the solenoid plunger 86*a* is pulled downwardly. This results in the locking lever 84 being pivoted such that its free end will engage one of the openings 82. When this happens, of course, the imbibing wheel 44 will no longer be able to drive the sun gear 76 and the former overruns the latter. Thus, the planet gears 72, 74 can both orbit and rotate with the respect to sun gear 76 since the former are in meshing engagement with the latter and are driven thereabout by the imbibing wheel 44.

It will be appreciated from the above that successive portions of the film strip 14 can be processed, imbibed and stored in a compact arrangement as they are advanced from the supply station 20 to the separating station.

Reference is now made to FIGS. 3 and 4 for showing the driving assembly 28. Included in the assembly 28 is a timing belt 90 which cooperates with timing pulleys 92 and 94. The timing pulley 92 is attached to and driven by a gear type variable speed motor 96. The timing pulley 94 is connected to the drive shaft 48 so as to drive the latter. As shown, the drive shaft 48 is journaled for rotation in the housing 85.

Figure 5:
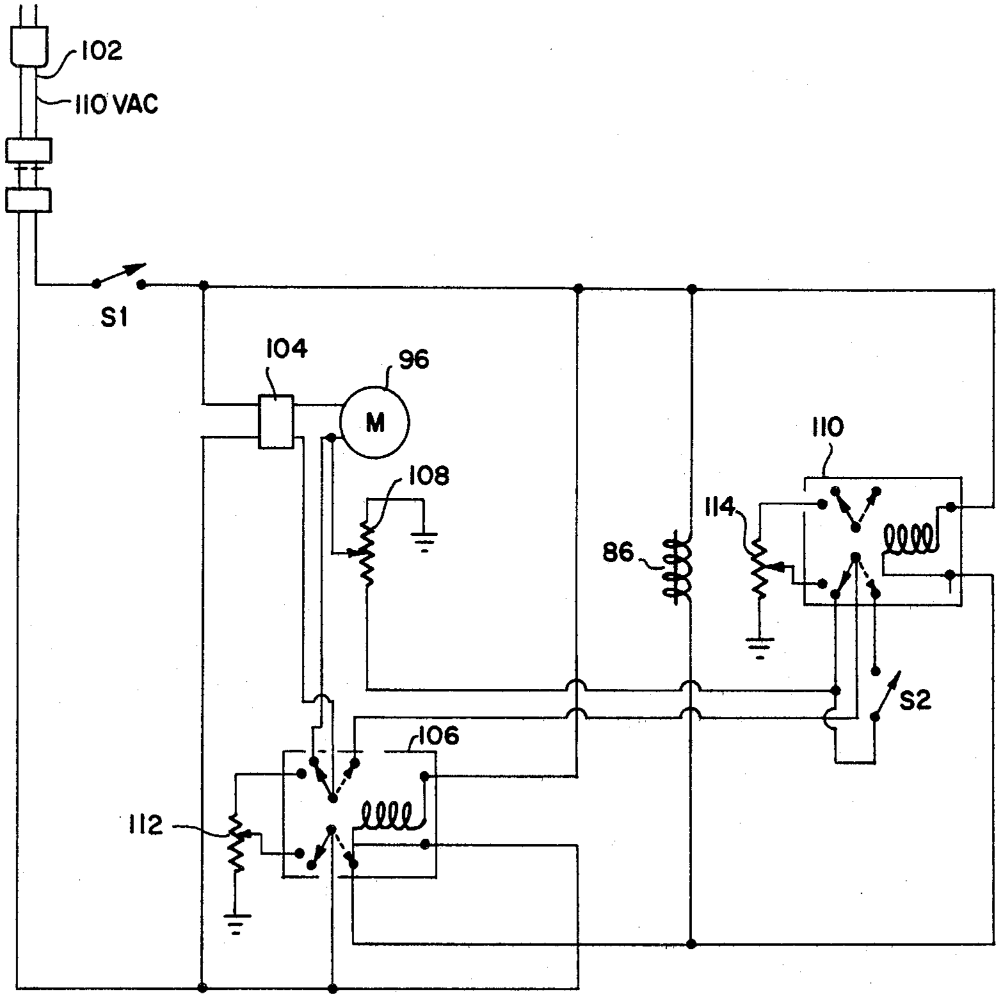
FIG. 5 is a circuit diagram.

Reference is now made to FIG. 5 for showing a circuit diagram for use in operating the processor of the present invention. For powering the circuit, an electric plug 102 is conectable to a power source of 110 volt AC. Power to the circuit is controlled by switch $S_1$, which is a conventional manually operated on/off type switch. A rectifier 104 is connected to the motor 96 and a timer relay 106. The motor 96 is connected to a motor speed potentiometer 108 and the timer relay 106. The motor speed potentiometer 108 allows control of the motor speed. Thus, the motor speed can be regulated and thus is significant as will be described. The potentiometer 108 is connectable to the timer relay 106 through the timer relay 110. Referring back to the timer relay 106, it is connected to start peel-apart potentiometer 112. The potentiometer 112 allows selection and variation of the start of peel-apart. That is, it controls the time the take-up reels 58, 60 begin to take-up the strips 14, 16. In other words, it controls the minimum imbibition time. The timer relay circuit 110 is connected to the potentiometer 114 which controls the maximum peel-apart time. In other words, it controls the time the motor 96 rotates the imbibing wheel 44. The $S_2$ switch is a mechanical switch which opens and closes in response to each revolution of the wheel 44. Although not specifically shown in FIGS. 1 through 4, the $S_2$ switch would ride upon the wheel 44 and would cooperate with a notch (not shown) in the wheel which would cause the $S_2$ switch to open after a single wheel revolution. Also, shown is the solenoid 86 which is connected to and operated by the timer relay 106.

When the $S_1$ switch is closed, the motor 96 is operated to run at a relatively high speed. Rotation of the motor 96 causes rotation of the imbibing wheel 44 and closing of the $S_2$ switch. Closing of the $S_1$ switch also serves to operate the timer relay 106. The start peel-apart potentiometer 112 controls the minimum imbibition time, that is, the time prior to peel-apart. Once the minimum imbibition time has been reached, the timer relay 106 operates to move its switches from their solid line positions to their dotted line positions. As a result, the solenoid 86 is energized. As previously noted, such energization is effective to pivot the locking lever 84 which engages a locking opening 82 to stop the sun gear 76. Besides the solenoid 86 being energized, the timer relay 110 is energized and the potentiometer 108 becomes effective for controlling the speed of the motor 96. When the take-up reels 58, 60 begin to take-up the strips 14, 16, they provide additional pulling forces on these strips. If the motor speed was not changed, the net effect would be an increase in the linear advancement rate of both strips 14, 16 beyond acceptable limits. Accordingly, the thickness of the processing fluid on the strip 16 would change. As noted, it is desired to control this thickness for proper film development. The potentiometer 108 allows the operator to control the speed of the motor 96. The potentiometer allows the motor speed to be reduced so that the speed of the imbibing wheel 44 drops a sufficient amount to pull the strip 16 at a slower speed to set-off the increased speed brought about by the action of the take-up reels 58, 60. Thus, the drop in speed of the motor 96 can be regulated through the potentiometer 108 so that the linear advancement rate of the strip 16 past the nozzle will remain within the predetermined range and preferably at the desired value.

Returning back to the potentiometer 114, it becomes effective to control the duration the imbibing wheel 44 is rotating. This time interval will be set in accordance with the amount of time it is necessary to advance and imbibe all the film. At the completion of this duration, the switches of the timer relay 110 move from their solid line positions to their dotted line positions. When this occurs, the switch $S_2$ will mechanically open and cause the motor 96 to stop. The opening of the $S_1$ switch stops the entire operation.

After having described the above structure of the present invention, it is believed the operation thereof is self-evident. However, a brief description of its operation will be subsequently set forth. To commence operation, the switch $S_1$ is closed. This causes the variable speed motor 96 to run at a first speed and pull both the film strip 14 and the cover sheet strip 16 from their supply reels. It will be appreciated that the leading ends of both strips 14 and 16 are leaders and have been attached previously to their respective take-up reels 58 and 60 after having been fed through the rollers 40 and over one of the spools 54 in the manner shown in the drawings. As the imbibing wheel 44 rotates, the laminated strips 14, 16 will be wrapped upon and supported by the spools 54. Continued rotation of the wheel 44 causes successive convolutions to be wrapped on and about the spools 54. Of course, when the emulsion surface 14*b* becomes laminated to the wetted surface of the strip 16, imbibition commences. Such lamination is caused by the rollers 40. Although successive convolutions take longer to separate than the initial convolution, the controlled imbibition time interval (e.g., 60 seconds–180 seconds) is of sufficient length to accept this longer imbibing time without adversely affecting the developing.

As noted, it is desired to commence peel-apart after a minimum acceptable imbibition time (e.g., 60 seconds). Peel-apart begins when the timer relay 106 operates to energize the solenoid 86 so as to cause the locking lever 84 to arrest rotation of the sun gear 76. With the sun gear 76 being held stationary, the planet gears 72, 74, which are being driven by the imbibing wheel 44, can orbit and rotate with respect to the sun gear 76. As a consequence, the take-up reels 58, 60 are caused to take-up their respective strips. In this manner, the inner convolutions are pulled inwardly and the laminated strips 14, 16 separate or peel-apart when the strips go to their respective reels. The take-up reels are rotated at a speed which is such as to cause peel-apart of the strips 14, 16 within the acceptable imbibition time interval. The potentiometer 114 controls the time the wheel 44 will continue to rotate. Once the timer relay 110 is actuated, the switches thereof move from their solid line positions to their dotted line positions. Thus, when the $S_2$ switch is mechanically opened by the imbibing wheel 44, the motor 96 stops.

Figure 6C:
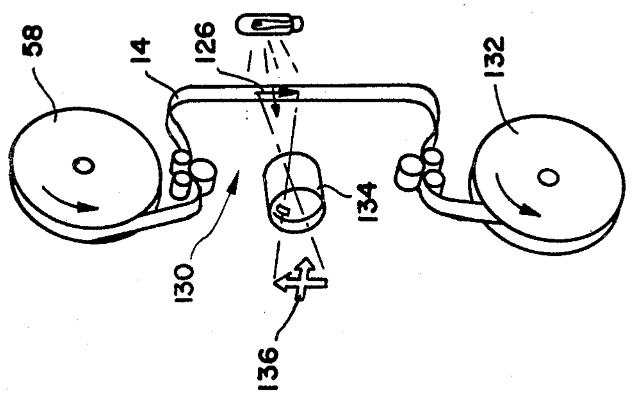
FIGS. 6A–C show a sequence of exposing, processing and viewing the photographic film.
Figure 6B:
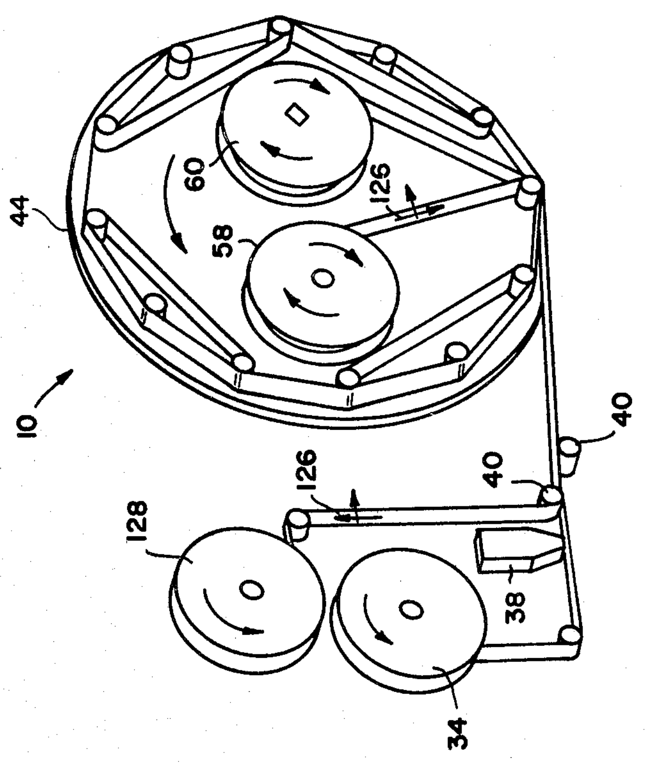
Figure 6A:
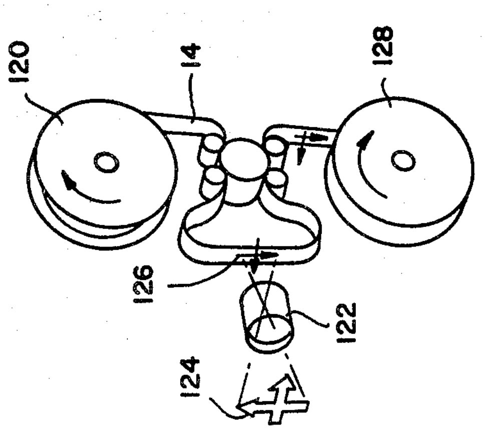

Another feature of the present invention is shown better in FIGS. 6A through 6C. This feature of the present invention allows viewing of the film 14 from the take-up reel 58 without the film having to be rewound. FIG. 6A is a schematic representation of a movie camera system, wherein a film supply reel 120 has the film 14 pass the objective lens 122 on its path to the take-up reel 128. Accordingly, the object 124 has its image 126 recorded on the film strip 14 in the orientation indicated. Thus, the film strip 14 is wrapped upon the reel 128 with the image orientation as shown in FIG. 6A.

The reel 128 is placed in the processor 10 and the film 14 is fed through the rollers 40, around a spool on the imbibing wheel and to the take-up reel 58. The film strip 14 is fed in such a fashion that its image 126 has the orientation shown in FIG. 6B. To do this, the reel 128 has been flipped over, relative to its orientation in FIG. 6A, so that when the film strip 14 is advanced to the imbibing wheel, the image 126 is reversed from its orientation in FIG. 6A.

The take-up reel 58, when put into a projector 130 such as schematically shown in FIG. 6C, is also flipped over relative to its orientation in FIG. 6B. Thus, when the film strip 14 is advanced from the reel 54 to the take-up reel 132, it passes the lens 134 and the image 126 has the proper orientation, as shown, so that when the image 126 is projected it will have the proper orientation.

Hence, the present invention provides for a continuous, automatic process, whereby in a single operation the film can be developed and in a manner whereby the processed film does not have to be rewound before being projected without any wastage. The processor in which this is done is compact and portable and allows storage of the film strip and cover sheet strip.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. Compact apparatus for treating an elongated strip of material, said apparatus comprising:

means including a rotatable assembly of a given size mounted for rotation on a given axis, the perimeter of said assembly being configured for supporting the strip of material and including means providing access of a leading portion of the strip to an interior portion defined by said assembly;

a take-up reel of a size comparatively smaller than said given size and being mounted for rotation in the interior of said assembly, said take-up reel being configured for attachment to the leading end portion of the strip thereto;

means for guiding said strip to the perimeter of said rotatable assembly;

means for treating one surface of the strip as it is advanced to the perimeter of said assembly; and, drive means for rotating both said assembly and said take-up reel to advance a number of convolutions of the strip around the perimeter of said assembly and advance successive sections of the treated strip starting with the innermost convolution into the interior of said assembly for take-up by said take-up reel.

2. Compact apparatus for developing an elongated strip of photographic film of the self-developing type and having an emulsion surface, said apparatus comprising:

an imbibing assembly including a wheel assembly of large diameter mounted for rotation on a given axis, means on said wheel assembly for supporting a number of convolutions of the strip of film on the perimeter of said wheel assembly and including means providing access of a leading portion of the film to an interior portion defined by said wheel assembly;

a film take-up reel of comparatively small diameter mounted for rotation within said interior portion, said film take-up reel being configured for attachment of the leading end of said film thereto;

means for guiding said film to the perimeter of said wheel assembly;

fluid depositing means for depositing a layer of processing fluid on the emulsion surface as it is advanced to the perimeter of said wheel assembly; and, drive means for rotating both said wheel assembly and said take-up reel to advance a number of windings of the film around the perimeter of said wheel assembly for imbibition thereof and then advance successive sections of the film with its processing fluid layer into said interior portion of said wheel for take-up by said take-up reel.

3. The apparatus of claim 2 wherein said means for supporting the film on said wheel assembly includes a plurality of circumferentially spaced spools journalled to said wheel assembly to also guide the film thereon whereby said spools define the effective perimeter of said wheel assembly.

4. The apparatus of claim 3 wherein said plurality of film supporting spools are mounted for rotation around respective axes generally parallel to said given axis and said supporting means includes endless bands of low-friction material around respective groups of said spools for enhancing withdrawal of the inner convolutions.

5. The apparatus of claim 2 additionally including means for guiding a cover sheet into overlying relation to said emulsion surface; a second take-up reel mounted for rotation within said interior portion in spaced relation to the first take-up reel; said second take-up reel being configured for attachment of a leading end portion of the cover sheet thereto; and said drive means including means for allowing rotation of said second take-up reel in unison with said first take-up reel, and at preselected velocities, so that said film and cover sheet are advanced together around said perimeter to provide an imbibition during a preselected imbibition period and to facilitate peel-apart thereof as they are advanced to their respective take-up reels in said interior portion to thereby terminate imbibition.

6. The apparatus of claim 5 wherein said cover sheet, after overlying the wetted emulsion, upon diverging separation from the film causes at least a portion of said emulsion to be retained by adhesion to said stripping sheet.

7. The apparatus of claim 5 wherein said drive means includes means for initially rotating or starting up said take-up reel after a number of windings of said cover sheet and film are on said perimeter and after a time approximately equal to a predetermined minimum imbibition time.

8. The apparatus of claim 7 wherein said drive means initially drives said wheel assembly through a number of revolutions such that a number of windings of said film and cover sheet occur around said wheel assembly prior said start up of said take-up reel.

9. The apparatus of claim 8 wherein said drive means includes means for initially driving said wheel assembly at a first predetermined rate prior to rotation of said take-up reels and then at a lower rate once rotation of said take-up reels occurs so as to at least partially compensate for the additional linear advancement of said film by said take-up reels and thereby retain the advancement of said film across said processing means within a predetermined range.

10. A method of treating an elongated strip of material comprising the steps of:

advancing a number of windings of the strip of material about the perimeter of a rotatable member; and, taking-up a leading edge of the material through an access in the perimeter to an interior portion of the rotatable member whereby successive sections of the windings starting from the leading edge are taken up.

11. A method of developing an elongated strip of self-developing type film comprising the steps of:

feeding the film along a given path;

treating at least a surface of the film as it is fed along the path;

wrapping several convolutions of the film about the perimeter of a rotatable member; and, taking-up successive sections of the convolutions of the wrapped film to an interior portion of the rotatable member starting from a leading portion of the innermost convolution.

12. A method of developing an elongated strip of self-developing type film comprising the steps of:

advancing film sheet along a first path;

advancing a cover sheet along a second path;

treating a surface of at least one of said sheets;

laminating the sheets together so that the treated surface comes into contact with the other sheet to begin imbibition;

advancing a number of windings of the laminated sheets about the perimeter of a supporting surface of a rotatable assembly for continuous imbibition; and, separating the laminated sheets by simultaneously withdrawing successive sections of the sheets through an access opening in the perimeter to an interior portion of the rotatable assembly starting with the innermost winding so that each sheet travels along a separate path to separate and thereby end imbibition.

13. Compact apparatus for developing an elongated strip of photographic film of the self-developing type and having an emulsion surface, said apparatus comprising:

an imbibing assembly including a wheel assembly of large diameter mounted for rotation on a given axis, means on said wheel assembly for supporting the strip of film on the perimeter of said wheel assembly and including means providing access of a leading portion of the film to the interior portion defined by said wheel assembly;

a film take-up reel of comparatively small diameter mounted for rotation within the interior portion, said film take-up reel being configured for attachment of the leading end of said film thereto;

means for guiding said film to the perimeter of said wheel assembly;

fluid depositing means for depositing a layer of processing fluid on the emulsion surface as it is advanced to the perimeter of said wheel assembly;

drive means for rotating both said wheel assembly and said take-up reel to advance the film around the perimeter of said wheel assembly and into said interior portion, whereby successive sections of the film with its processing fluid layer are advanced over a portion of the perimeter of said wheel assembly for imbibition and then advanced into said interior portion of said wheel for take-up; and, said drive means includes means for initially rotating said take-up reel after a time approximately equal to a predetermined minimum imbibition time, and said drive means initially drives said wheel assembly through a number of revolutions such that a number of windings of said film occur around said wheel assembly prior to start up of said take-up reel.

14. The apparatus of claim 13 wherein said drive means includes means for initially driving said wheel assembly at a first predetermined rate prior to rotation of said take-up reels and then at a lower rate once rotation of said take-up reels occurs so as to at least partially compensate for the additional linear advancement of said film by said take-up reels and thereby retain the advancement of said film across said processing means within a predetermined range.

* * * * *